(12) United States Patent
Chang (10) Patent No.: US 10,860,423 B2
(45) Date of Patent: Dec. 8, 2020

(54) METHOD AND APPARATUS FOR PERFORMING DYNAMIC RECOVERY MANAGEMENT REGARDING REDUNDANT ARRAY OF INDEPENDENT DISKS

(71) Applicant: Silicon Motion Inc., Hsinchu County (TW)

(72) Inventor: An-Nan Chang, Hsinchu County (TW)

(73) Assignee: Silicon Motion, Inc., Hsinchu County (TW)

( * ) Notice: Subject to any disclaimer, the term of this patent is extended or adjusted under 35 U.S.C. 154(b) by 0 days.

(21) Appl. No.: 16/513,675

(22) Filed: Jul. 16, 2019

(65) Prior Publication Data

US 2020/0210290 A1 Jul. 2, 2020

(30) Foreign Application Priority Data

Jan. 2, 2019 (TW) .............................. 108100004 A (51) Int. Cl.
*G06F 11/10* (2006.01)
*G06F 11/14* (2006.01)
*G06F 3/06* (2006.01)

(52) U.S. Cl.
CPC ........ *G06F 11/1076* (2013.01); *G06F 3/0619* (2013.01); *G06F 3/0689* (2013.01); *G06F 11/1471* (2013.01); *G06F 3/0653* (2013.01)

(58) Field of Classification Search
CPC .................................................. G06F 11/1076
USPC ................................ 714/764, 768, 770, 767
See application file for complete search history.

(56) References Cited

U.S. PATENT DOCUMENTS

| | | | |
|---|---|---|---|
| 5,826,001 A | 10/1998 | Lubbers | |
| 6,950,901 B2 | 9/2005 | Chiu | |
| 9,535,563 B2 * | 1/2017 | Hoffberg | ............ H04N 21/4532 |
| 2005/0055603 A1 * | 3/2005 | Soran | ...................... G06F 3/065 |
| | | | 714/6.32 |
| 2005/0108594 A1 | 5/2005 | Menon | |

* cited by examiner

*Primary Examiner* — Fritz Alphonse
(74) *Attorney, Agent, or Firm* — Winston Hsu (57) ABSTRACT

A method and apparatus for performing dynamic recovery management regarding a RAID are provided. The method includes: writing a first set of protected data into a first protected access unit of multiple protected access units of the RAID, and recording a first set of management information corresponding to the first set of protected data, for data recovery of the first set of protected data; and when any storage device of multiple storage devices of the RAID malfunctions, writing a second set of protected data into a second protected access unit of the protected access units, and recording a second set of management information corresponding to the second set of protected data, for data recovery of the second set of protected data. Any set of the first set of protected data and the second set of protected data includes data and multiple parity-check codes.

14 Claims, 10 Drawing Sheets

METHOD AND APPARATUS FOR PERFORMING DYNAMIC RECOVERY MANAGEMENT REGARDING REDUNDANT ARRAY OF INDEPENDENT DISKS

BACKGROUND OF THE INVENTION

1. Field of the Invention

The present invention is related to storage systems, and more particularly, to a method and apparatus for performing dynamic recovery management regarding a redundant array of independent disks (RAID).

2. Description of the Prior Art

A redundant array of independent disks (RAID) may be implemented in a server. Through various types of RAID schemes, data can obtain protection at a corresponding level. For the purpose of data backup, the server may be designed to be equipped with a copy-on-write (COW) architecture. Due to features of the COW architecture, performance of the server may degrade as time goes by. To prevent this, the server may be designed to be equipped with a redirect-on-write (ROW) architecture, but this may result in other problems. When any disk within the RAID malfunctions, if a second disk malfunctions, the probability of data of the server being unrecoverable will greatly increase. Thus, there is a need for a novel method and associated architecture, to guarantee a storage system can properly operate under various situations.

SUMMARY OF THE INVENTION

An objective of the present invention is to provide a method and apparatus for performing dynamic recovery management regarding a redundant array of independent disks (RAID), to solve the related art problems.

Another objective of the present invention is to provide a method and apparatus for performing dynamic recovery management regarding a RAID that can guarantee the storage system can properly operate under various situations.

Another objective of the present invention is to provide a method and apparatus for performing dynamic recovery management regarding a RAID that can solve the related art problems without introducing any side effect or in a way that is less likely to introduce side effects.

At least one embodiment of the present invention provides a method for performing dynamic recovery management regarding a RAID. The method may comprise: writing a first set of protected data into a first protected access unit of multiple protected access units of the RAID, and recording a first set of management information corresponding to the first set of protected data, for data recovery of the first set of protected data, wherein the RAID comprises multiple storage devices, the first set of protected data comprises data and multiple parity-check codes, RAID information within the first set of management information indicates the first set of protected data is stored in a first set of storage devices of the multiple storage devices, and validity information within the first set of management information indicates respective validities of the first set of protected data; and in response to any storage device of the multiple storage devices malfunctioning, writing a second set of protected data into a second protected access unit of the multiple protected access units, and recording a second set of management information corresponding to the second set of protected data, for data recovery of the second set of protected data, wherein the second set of protected data comprises data and multiple parity-check codes, RAID information within the second set of management information indicates the second set of protected data is stored in a second set of storage devices of the multiple storage devices, and validity information within the second set of management information indicates respective validities of the second set of protected data. The second set of storage devices is different from the first set of storage devices.

The present invention further provides a storage system operating according to the aforementioned method, wherein the storage system comprises the RAID.

At least one embodiment of the present invention provides an apparatus for performing dynamic recovery management regarding a RAID. The apparatus may comprise a processing circuit, wherein the processing circuit is positioned in a storage system, and is configured to control operations of the storage system. The operations of the storage system may comprise: writing a first set of protected data into a first protected access unit of multiple protected access units of the RAID, and recording a first set of management information corresponding to the first set of protected data, for data recovery of the first set of protected data, wherein the RAID comprises multiple storage devices, the first set of protected data comprises data and multiple parity-check codes, RAID information within the first set of management information indicates the first set of protected data is stored in a first set of storage devices of the multiple storage devices, and validity information within the first set of management information indicates respective validities of the first set of protected data; and in response to any storage device of the multiple storage devices malfunctioning, writing a second set of protected data into a second protected access unit of the multiple protected access units, and recording a second set of management information corresponding to the second set of protected data, for data recovery of the second set of protected data, wherein the second set of protected data comprises data and multiple parity-check codes, RAID information within the second set of management information indicates the second set of protected data is stored in a second set of storage devices of the multiple storage devices, and validity information within the second set of management information indicates respective validities of the second set of protected data. The second set of storage devices is different from the first set of storage devices.

The method and apparatus of the present invention can guarantee the storage system will properly operate under various situations. For example, when any disk within a RAID malfunctions, the system manager does not need to be concerned that the probability of the data of the server being unrecoverable will greatly increase due to a second disk malfunctioning. In addition, the method and apparatus of the present invention provide a powerful dynamic recovery management mechanism. Thus, the objectives of optimal performance, high security, budget control, etc. can be achieved. Additionally, the method and apparatus of the present invention can solve the problems in the related art without introducing any side effect or in a way that is less likely to introduce side effects.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
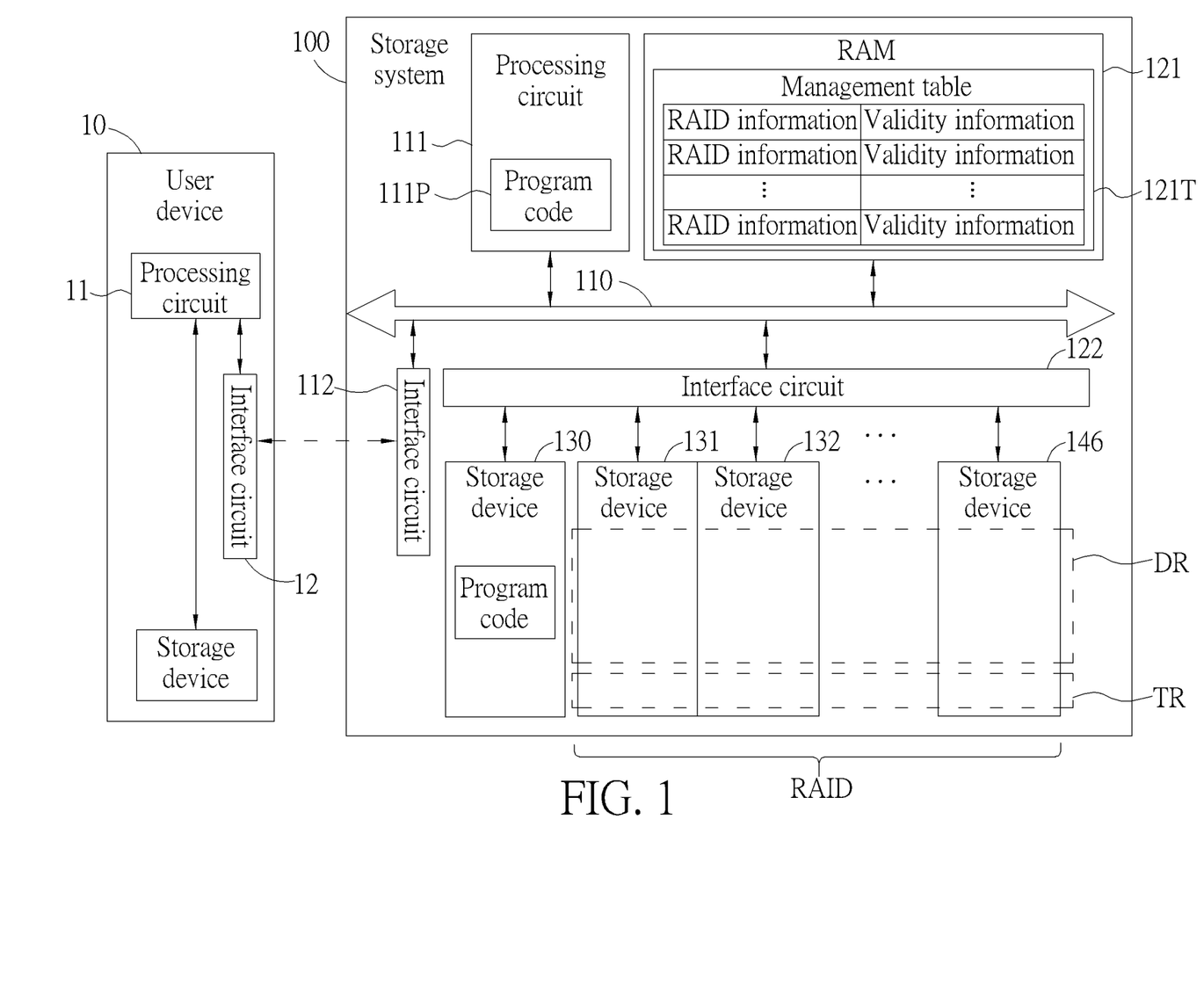
FIG. 1 is a diagram illustrating a storage system and a user device according to an embodiment of the present invention.

FIG. 1 is a diagram illustrating a storage system 100 and a user device 10 according to an embodiment of the present invention. The user device 10 may comprise a processing circuit 11 (e.g. at least one processor and associated circuits), and may further comprise an interface circuit 12 coupled to the processing circuit 11, and a storage device. The storage system 100 may comprise a processing circuit 111 (e.g. at least one processor and associated circuits), and may further comprise interface circuits 112 and 122 and random access memory (RAM) 121 that are coupled to the processing circuit 111 through a bus 110. Storage devices {130, 131, 132, . . . , 146} (such as hard disks and/or solid state drives) may be installed in the storage system 100 through the interface circuit 122, and more particularly, the storage devices {131, 132, . . . , 146} may form a RAID, where a program code 111P executed on the processing circuit 111 may be read from the storage device 130 (e.g. a system disk), and may maintain (e.g. establish, store and/or update) a management table 121T within the RAM 121 in order to perform related operations to manage a data region DR. In addition, the management table 121T may comprise multiple sets of management information for dynamic recovery management, and each set of management information within the multiple sets of management information (e.g. a row of information within the management table 121T) may comprise RAID information such as RAID bitmap information, and may comprise validity information such as validity bitmap information. When needed, the management table 121T may be backed up in a table region TR, but the present invention is not limited thereto. Additionally, the interface circuits 12 and 112 may be implemented as a wired network interface and/or wireless network interface, to allow the storage system 100 and the user device 10 to exchange information with each other. A user may access (read or write) user data in the storage system 100 through the user device 10. Examples of the user device 10 may include, but are not limited to: a multifunctional mobile phone, a tablet, a wearable device and a personal computer (such as a desktop computer and a laptop computer). Examples of the storage system 100 may include, but are not limited to: a server such as a storage server. According to some embodiments, the architecture of the storage system 100 may vary. For example, the program code 111P may be implemented by a dedicated hardware configured in the interface circuit 122, to perform related operations of the present invention method. According to some embodiments, the number of storage devices {131, 132, . . . , 146} within the RAID may vary, e.g. may be increased or reduced.

Figure 2:
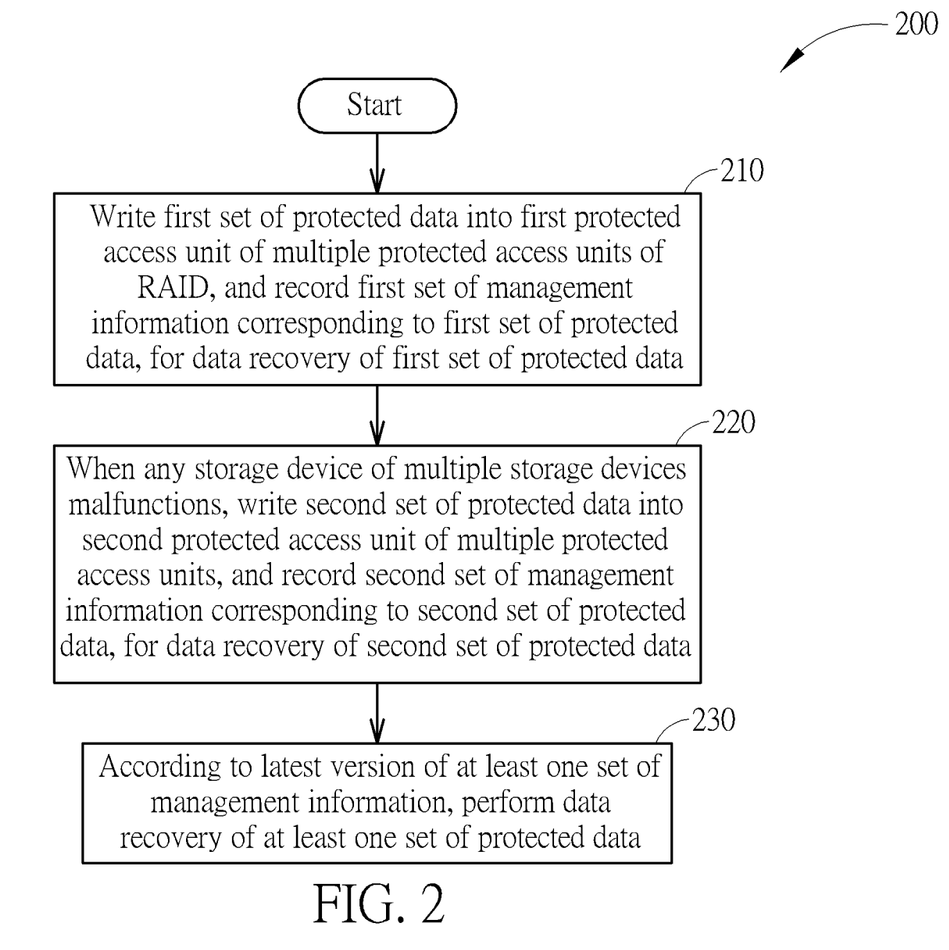
FIG. 2 is a working flow of a method for performing dynamic recovery management regarding a RAID (such as that shown in FIG. 1) according to an embodiment of the present invention.

FIG. 2 is a working flow 200 of a method for performing dynamic recovery management regarding a RAID (such as the RAID shown in FIG. 1) according to an embodiment of the present invention, where the RAID may comprise multiple storage devices such as the storage devices {131, 132, . . . , 146}. The method may be applied to the storage system 100, the processing circuit 111 executing the program code 111P, and associated components shown in FIG. 1. For example, the storage system 100 (e.g. the processing circuit 111) may maintain (e.g. establish, store and/or update) respective validity information of the multiple sets of management information within the management table 121T according to at least one health state of the RAID such as one or more health states thereof, in order to generate the latest version of the multiple sets of management information. Examples of the one or more health states of the RAID may include, but are not limited to: a normal state, a malfunction state and a recovery state of one or more storage devices within the RAID.

In Step 210, the storage system 100 (e.g. the processing circuit 111) writes a first set of protected data into a first protected access unit of multiple protected access units of the RAID, and records a first set of management information corresponding to the first set of protected data, such as a certain row of information of the management table 121T, for data recovery of the first set of protected data, where the first set of protected data comprises data and multiple parity-check codes, RAID information within the first set of management information indicates the first set of protected data being stored in a first set of storage devices of the multiple storage devices, and validity information within the first set of management information indicates respective validities of the first set of protected data.

According to this embodiment, the RAID information within the first set of management information may comprise first RAID bitmap information, and the first RAID bitmap information may comprise a first set of first bits, where the first set of first bits indicates the first set of protected data is respectively stored in the first set of storage devices. For better comprehension, assume that the multiple storage devices comprise all of the storage devices {131, 132, . . . , 146}, and all these storage devices are currently operating normally. Under this situation, the first set of storage devices may comprise all of the multiple storage devices, but the present invention is not limited thereto. The first set of first bits may be 1111111111111111 (which may be recorded as 0xFFFF) to indicate the first set of protected data (such as the aforementioned data and multiple parity-check codes therein) is respectively stored in the storage devices {131, 132, . . . , 146}. In addition, the validity information within the first set of management information may comprise first validity bitmap information, and the first validity bitmap information may comprise a first set of second bits, where the first set of second bits indicates respective validities of the first set of protected data, respectively. Under a situation where all the storage devices {131, 132, ..., 146} are currently operating normally, the first set of second bits may be 1111111111111111 (which may be recorded as 0xFFFF) to indicate all the first set of protected data is valid.

In Step 220, when any storage device of the multiple storage devices malfunctions, the storage system 100 (e.g. the processing circuit 111) writes a second set of protected data into a second protected access unit of the multiple protected access units, and records a second set of management information corresponding to the second set of protected data, such as another row information within the management table 121T, for data recovery of the second set of protected data, where the second set of protected data comprises data and multiple parity-check codes, RAID information within the second set of management information indicates the second set of protected data is stored in a second set of storage devices of the multiple storage devices, and validity information within the second set of management information indicates respective validities of the second set of protected data. More particularly, the second set of storage devices is different from the first set of storage devices. For example, the second set of storage devices does not comprise the aforementioned any storage device of the multiple storage devices.

According to this embodiment, the RAID information within the second set of management information may comprise second RAID bitmap information, and the second RAID bitmap information may comprise a second set of first bits, where the second set of first bits indicates the second set of protected data is respectively stored in the second set of storage devices. For better comprehension, assume that the multiple storage devices comprise all of the storage devices {131, 132, ..., 146}, and most of these storage devices are currently operating normally, where the storage device 131 malfunctions. Under this situation, the second set of storage devices may comprise the storage devices {132, ..., 146}, but the present invention is not limited thereto. The second set of first bits may be 0111111111111111 (which may be recorded as 0x8FFF) to indicate the second set of protected data (such as the aforementioned data and multiple parity-check codes therein) is respectively stored in the storage devices {132, ..., 146}. In addition, the validity information within the second set of management information may comprise second validity bitmap information, and the second validity bitmap information may comprise a second set of second bits, where the second set of second bits indicates respective validities of the second set of protected data, respectively. Under a situation where all the storage devices {132, ..., 146} are currently operating normally, the second set of second bits may be 0111111111111111 (which may be recorded as 0x8FFF) to indicate all the second set of protected data is valid. Please note that, since the second set of first bits 0111111111111111 indicates the second set of protected data is respectively stored in the storage devices {132, ..., 146}, only the last 15 bits 111111111111111 are meaningful in the second set of second bits 0111111111111111 while the first bit 0 may be regarded as "Don't care" according to some viewpoints, but the present invention is not limited thereto. When needed, and more particularly, when the health state of the RAID (e.g. one or more storage devices therein) changes, the storage system 100 (e.g. the processing circuit 111) may update respective validity information of the multiple sets of management information, such as multiple sets of second bits, to generate latest versions of the multiple sets of management information, where each set of second bits within the multiple sets of second bits indicates respective validity of a corresponding set of protected data, respectively.

In Step 230, according to a latest version of at least one set of management information, the storage system 100 (e.g. the processing circuit 111) performs data recovery of at least one set of protected data, where the aforementioned at least one set of management information corresponds to the aforementioned at least one set of protected data. For example, the aforementioned at least one set of management information may comprise the first set of management information, and the aforementioned at least one set of protected data may comprise the first set of protected data. In another example, the aforementioned at least one set of management information may comprise the second set of management information, and the aforementioned at least one set of protected data may comprise the second set of protected data. In yet another example, the aforementioned at least one set of management information may comprise the first set of management information and the second set of management information, and the aforementioned at least one set of protected data may comprise the first set of protected data and the second set of protected data.

For better comprehension, the method may be illustrated by the working flow 200 shown in FIG. 2, but the present invention is not limited thereto. According to some embodiments, one or more steps may be added, removed or modified in the working flow 200.

When the storage device mentioned in Step 220 (i.e. the aforementioned any storage device of the multiple storage devices) malfunctions, the storage system 100 (e.g. the processing circuit 111) may update the validity information within the first set of management information, to indicate that protected data within the first set of protected data stored in this storage device is invalid, for data recovery of the first set of protected data. In Step 230, according to latest validity information within the first set of management information, the storage system 100 (e.g. the processing circuit 111) may read valid protected data within the first set of protected data, to perform data recovery of the first set of protected data according to the valid protected data, where the valid protected data comprises at least one portion (such as one portion or all) of the data within the first set of protected data, and comprises at least one parity-check code of the multiple parity-check codes (such as one or more of these parity-check codes) within the first set of protected data.

In another example, when a second storage device of the multiple storage devices malfunctions, the storage system 100 (e.g. the processing circuit 111) may update the validity information within the first set of management information to indicate that protected data within the first set of protected data stored in the second storage device is invalid, for data recovery of the first set of protected data. In Step 230, according to latest validity information within the first set of management information, the storage system 100 (e.g. the processing circuit 111) may read valid protected data of the first set of protected data, to perform data recovery of the first set of protected data according to the valid protected data, where the valid protected data comprises at least one portion (such as one portion or all) of the data within the first set of protected data, but the present invention is not limited thereto. Under some situations (e.g. the valid protected data comprises a portion of the data), the valid protected data may comprise at least one parity-check code of the multiple parity-check codes (such as one or more of these parity-check codes) within the first set of protected data.

In yet another example, when the second storage device malfunctions, the storage system 100 (e.g. the processing circuit 111) may update the validity information within the second set of management information to indicate that protected data within the second set of protected data stored in the second storage device is invalid, for data recovery of the second set of protected data. In Step 230, according to latest validity information within the second set of management information, the storage system 100 (e.g. the processing circuit 111) may read valid protected data within the second set of protected data to perform data recovery of the second set of protected data according to the valid protected data, where the valid protected data comprises at least one portion (such as one portion or all) of the data within the second set of protected data, and comprises at least one parity-check code of the multiple parity-check codes (such as one or more of these parity-check codes) within the second set of protected data.

Figure 3:
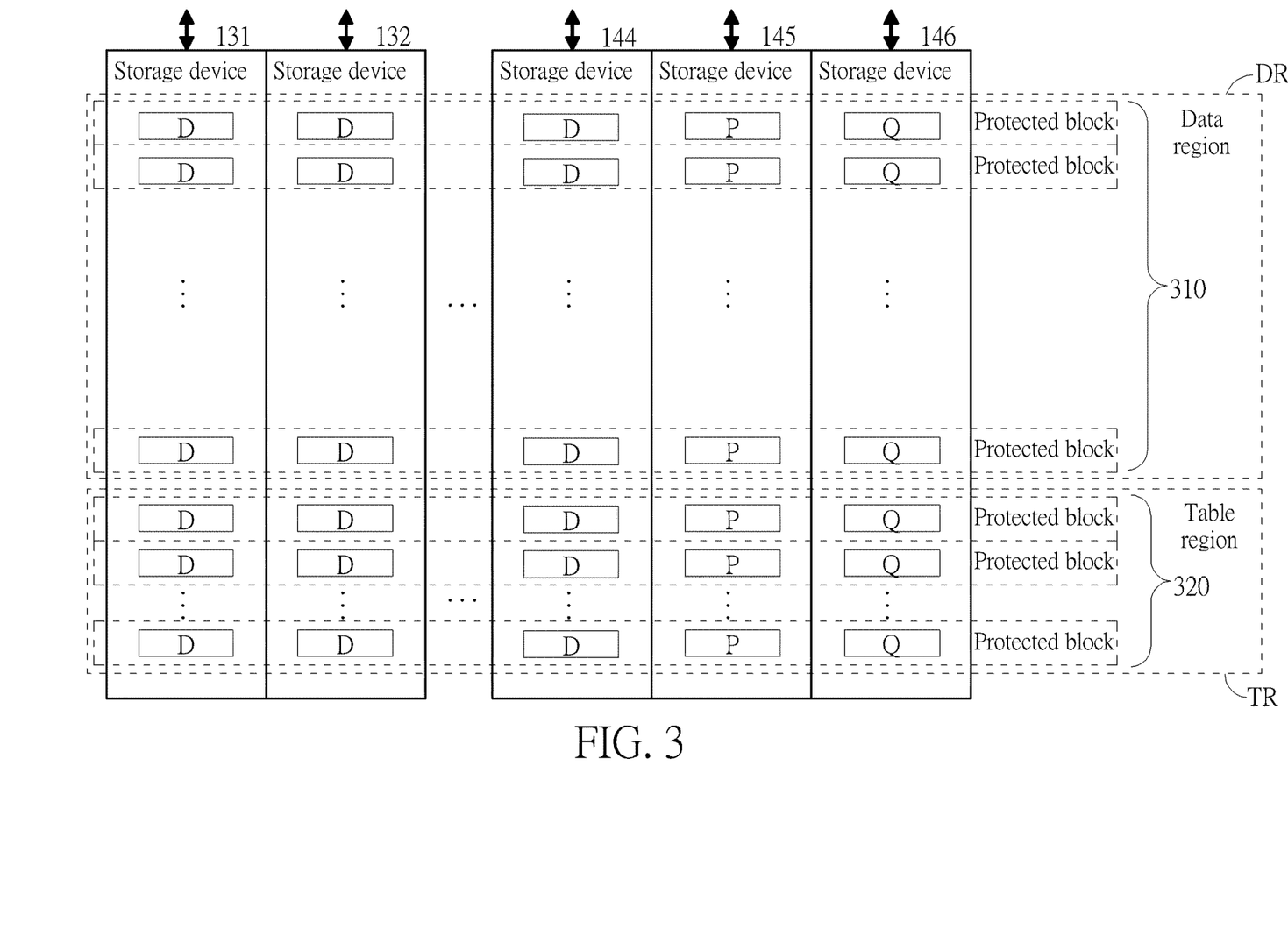
FIG. 3 illustrates a plurality of protected access units according to an embodiment of the present invention, where examples of the plurality of protected access units may include protected blocks.

FIG. 3 illustrates a plurality of protected access units according to an embodiment of the present invention, where examples of the plurality of protected access units may include protected blocks 310 and 320, but the present invention is not limited thereto. Regarding any protected block within the protected blocks 310 and 320, a symbol "D" may represent data within the protected block such as user data respectively stored in some storage devices, and symbols "P" and "Q" may respectively represent parity-check codes within the protected block. Through the parity check codes P and Q, the data D can be protected. The parity-check codes P and Q may be the same or different from each other, and more particularly, under a situation where they are different from each other, the storage system 100 (e.g. the processing circuit 111) may respectively adopt different encoding rules to perform error correction code (ECC) encoding on the data D in order to generate corresponding parity-check codes P and Q. For better comprehension, the multiple storage devices of the RAID may comprise the storage devices {131, 132, ..., 144, 145, 146}, but the present invention is not limited thereto. Regarding any protected block within the protected blocks 310 and 320, the storage devices {131, 132, ..., 144, 145, 146} may store a set of protected data (e.g. the first set of protected data), and any of the storage devices {131, 132, ..., 144, 145, 146} may store corresponding protected data within this set of protected data, such as the data D, the parity-check code P or the parity-check code Q. According to some embodiments, a type and/or a protection degree of the RAID may vary, where the user data may obtain protection of a corresponding type and/or degree. The arrangement of the data D, the parity-check code P and/or the parity-check code Q may vary. In another example, a number of storage devices configured to store the data D and/or a number of storage devices configured to store the parity-check codes (such as the parity-check codes P and Q) may vary. In yet another example, regarding any protected block within the protected blocks 310 and 320, a total number of storage devices configured to store the data D and the parity-check codes P and Q may vary.

Figure 4:
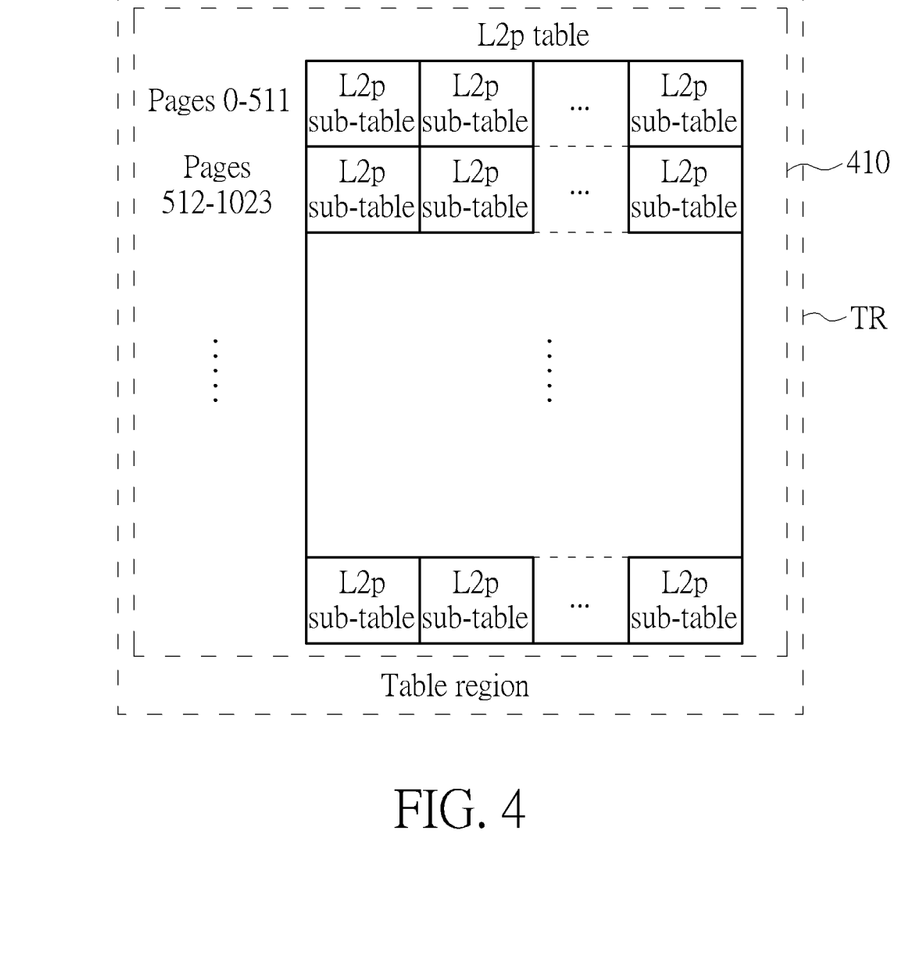
FIG. 4 illustrates a redirect-on-write (ROW) scheme of the method according to an embodiment of the present invention.

FIG. 4 illustrates a redirect-on-write (ROW) scheme of the method according to an embodiment of the present invention. The storage system 100 (e.g. the processing circuit 111) can write multiple sets of protected data into multiple protected blocks of the RAID in a ROW manner, and respectively record the multiple sets of management information corresponding to the multiple sets of protected data, for data recovery of the multiple sets of protected data, where any set of protected data within the multiple sets of protected data may comprise data (such as the data D) and multiple parity-check codes (such as the parity-check codes P and Q). Regarding any protected access unit (e.g. a certain protected block within the data region DR) within the aforementioned multiple protected access units in Step 210, the storage system 100 (e.g. the processing circuit 111) may record or update mapping information between a logical address of the data D and a protected-access-unit address (p-address) of this protected access unit into a logical-address-to-p-address (L2p) table 410 within the table region TR. L2p table 410 may comprise multiple L2p sub-tables, where a first row of L2p sub-tables may respectively map pages 0-511 (more particularly, logical addresses 0-511) to respective storage locations thereof (e.g. some protected access units such as protected blocks); a second row of L2p sub-tables may respectively map pages 512-1023 (more particularly, logical addresses 512-1023) to respective storage locations thereof (e.g. some protected access units such as protected blocks); and the rest may be induced by analogy, but the present invention is not limited thereto. According to some embodiments, these storage locations may be regarded as ROW locations.

According to some embodiments, a total number of storage devices within the RAID may vary, and the total number of storage device configured to store the data D and the parity-check codes P and Q may accordingly vary. For example, the RAID may comprise ten storage devices, such as the first ten storage devices {131, 132, ... } within the storage devices {131, 132, ..., 146} shown in FIG. 1. For better comprehension, in the embodiments shown in FIG. 5 to FIG. 10, assume the ten storage devices {131, 132, ... } may be respectively represented by {SD0, SD1, ..., SD9}.

Figure 5:
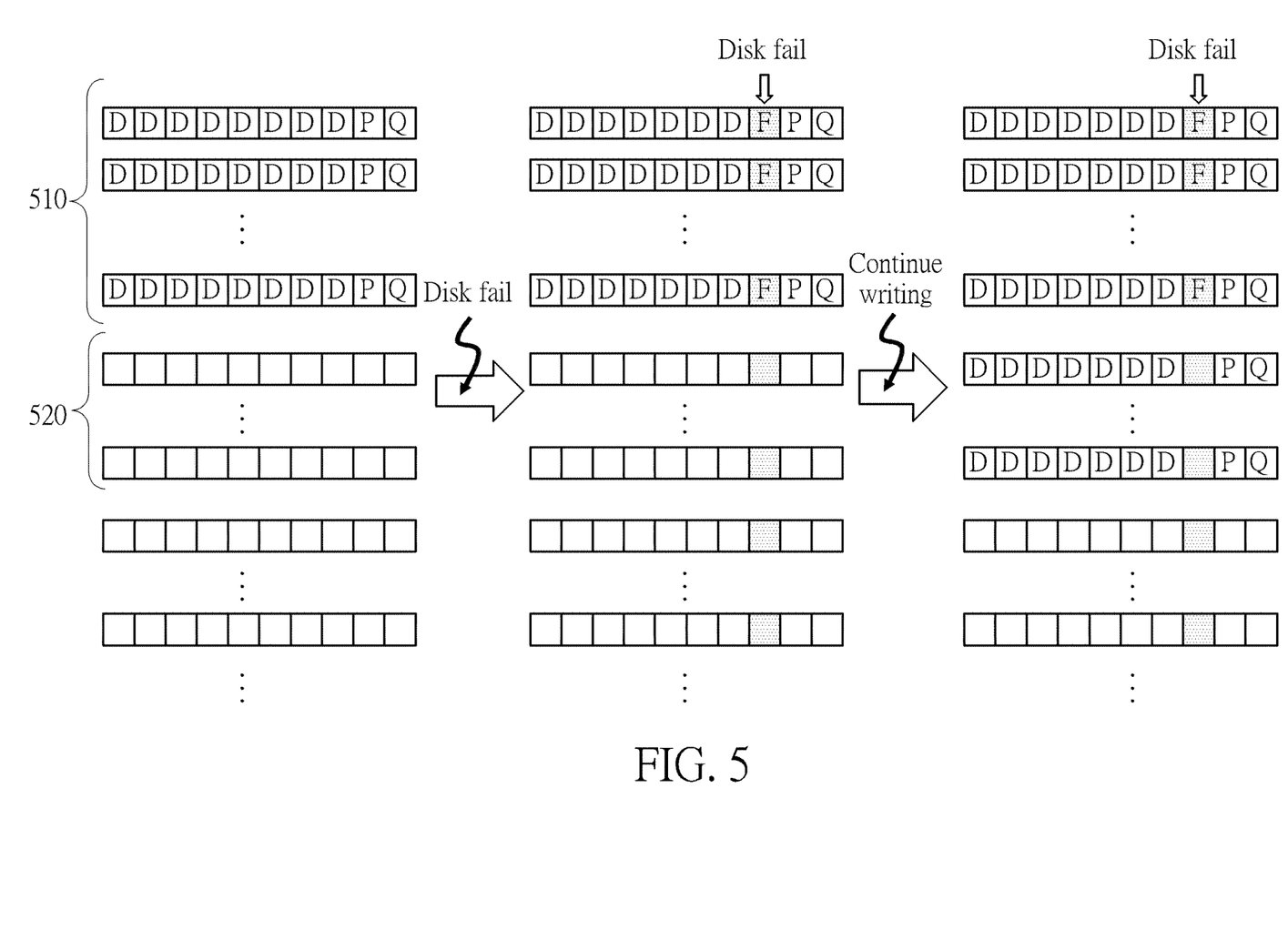
FIG. 5 illustrates a control scheme of the method according to an embodiment of the present invention.

FIG. 5 illustrates a control scheme of the method according to an embodiment of the present invention, where the plurality of protected access units may comprise multiple groups of protected access units, such as a group 510 that is firstly written and a group 520 that is subsequently written, but the present invention is not limited thereto. For brevity, a row of small frames may represent a protected access unit, and ten small frames (from left to right) within the row of small frames may respectively correspond to the ten storage devices {131, 132, ... } such as the storage devices {SD0, SD1, ..., SD9}, and more particularly, may represent subsets of this protected access unit which are respectively located at the storage devices {SD0, SD1, ..., SD9}. Any row of small frames labeled with symbols "D", "P" and "Q" may represent a protected access unit in which the data D and the parity-check codes P and Q were written before.

As shown in the upper left corner of FIG. 5, for protected data in any protected access unit within the group 510, the data D and the parity-check codes P and Q may be respectively stored in the storage devices {SD0, SD1, ..., SD9}. Regarding protected data in each of the protected access units within the group 510, the storage system 100 (e.g. the processing circuit 111) may respectively record corresponding RAID bitmap information and validity bitmap information as a set of first bits 1111111111000000 and a set of second bits 1111111111000000, meaning the protected data is stored in the storage devices {SD0, SD1, ..., SD9}, respectively, and is all valid. Afterwards, when a certain storage device such as the storage device SD7 malfunctions (this is labeled "Disk fail" for better comprehension), protected data within the storage device SD7 becomes unobtainable (this is labeled "F" for better comprehension), and therefore may be regarded as invalid. Regarding the protected data in each of the protected access units within the group 510, the storage system 100 (e.g. the processing circuit 111) may update corresponding validity bitmap information as a set of second bits 1111111011000000, meaning the majority of the protected data is valid, but the protected data within the storage device SD7 may be regarded as invalid. Afterwards, the storage system 100 (e.g. the processing circuit 111) may continue writing, and more particularly, write the user data into protected access units within the group 520. Regarding protected data in each of the protected access units within the group 520, the storage system 100 (e.g. the processing circuit 111) may respectively record corresponding RAID bitmap information and validity bitmap information as a set of first bits 1111111011000000 and a set of second bits 1111111011000000, meaning the protected data is stored in nine normal storage devices {SD0, SD1, . . . , SD6, SD8, SD9} within the storage devices {SD0, SD1, . . . , SD9}, respectively, and is all valid (in the storage devices {SD0, SD1, . . . , SD6, SD8, SD9}).

Please note that the protected data in each of the protected access units within the group 510 may be regarded as (8+2) protected data, where 8 means the data D is distributed in eight storage devices {SD0, SD1, . . . , SD7} (the storage device SD7 malfunctions), and 2 means the parity-check codes P and Q are distributed in two storage devices {SD8, SD9}. In addition, the protected data in each of the protected access units within the group 520 may be regarded as (7+2) protected data, where 7 means the data D is distributed in seven storage devices {SD0, SD1, . . . , SD6}, and 2 means the parity-check codes P and Q are distributed in two storage devices {SD8, SD9}

Figure 6:
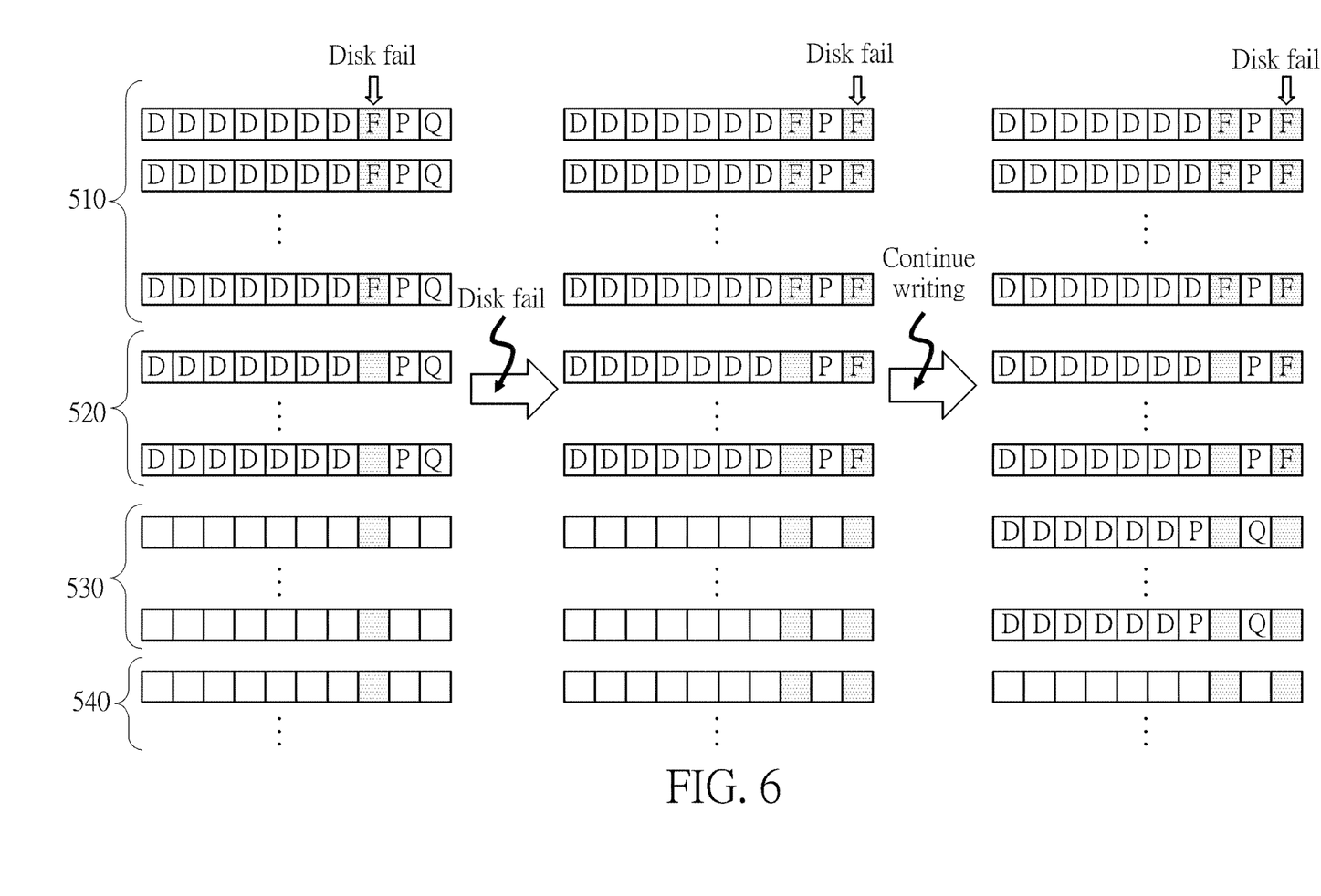
FIG. 6 illustrates a control scheme of the method according to another embodiment of the present invention.

FIG. 6 illustrates a control scheme of the method according to another embodiment of the present invention, where the multiple groups of protected access units may comprise the two groups 510 and 520 which are written before, a group 530 which is subsequently written and a group 540 which is not written yet, but the present invention is not limited thereto. The leftmost portion of FIG. 6 is similar to the rightmost portion of FIG. 5. When another storage device such as the storage device SD9 malfunctions (labeled "Disk fail" for better comprehension), protected data within the storage device SD9 becomes unobtainable (labeled "F" for better comprehension), and therefore may be regarded as invalid. Regarding the protected data in each of the protected access units within the group 510, the storage system 100 (e.g. the processing circuit 111) may update corresponding validity bitmap information as a set of second bits 1111111010000000, meaning the majority of the protected data is valid, but the protected data stored by the storage devices SD7 and SD9 may be regarded as invalid. Regarding the protected data in each of the protected access units within the group 520, the storage system 100 (e.g. the processing circuit 111) may update corresponding validity bitmap information as a set of second bits 1111111010000000, meaning the majority of the protected data is valid, but the protected data stored by the storage device SD9 may be regarded as invalid. Afterwards, the storage system 100 (e.g. the processing circuit 111) may continue writing, and more particularly, write the user data into protected access units within the group 530. Regarding protected data in each of the protected access units within the group 530, the storage system 100 (e.g. the processing circuit 111) may respectively record corresponding RAID bitmap information and validity bitmap information as a set of first bits 1111111010000000 and a set of second bits 1111111010000000, meaning the protected data is respectively stored in eight normal storage devices {SD0, SD1, . . . , SD6, SD8} within the storage devices {SD0, SD1, . . . , SD9} and is all valid (in the storage devices {SD0, SD1, . . . , SD6, SD8}).

Please note that the protected data in each of the protected access units within the group 530 may be regarded as (6+2) protected data, where 6 means the data D is distributed in six storage device {SD0, SD1, . . . , SD5}, and 2 means the parity-check codes P and Q are distributed in two storage devices {SD6, SD8}. As shown in the rightmost portion of FIG. 6, a number RAID_DISK(510) of RAID disks {SD0, SD1, . . . , SD9} adopted by the group 510 is equal to 10, where a number FAIL_DISK(510) of malfunctioning disks {SD7, SD9} is equal to 2. In addition, a number RAID_DISK(520) of RAID disks {SD0, SD1, . . . SD6, SD8, SD9} adopted by the group 520 is equal to 9, where a number FAIL_DISK(520) of malfunctioning disks {SD9} is equal to 1. Additionally, a number RAID_DISK(530) of RAID disks {SD0, SD1, . . . , SD6, SD8} adopted by the group 530 is equal to 8, where a number FAIL_DISK(530) of malfunctioning disks is equal to 0.

Figure 7:
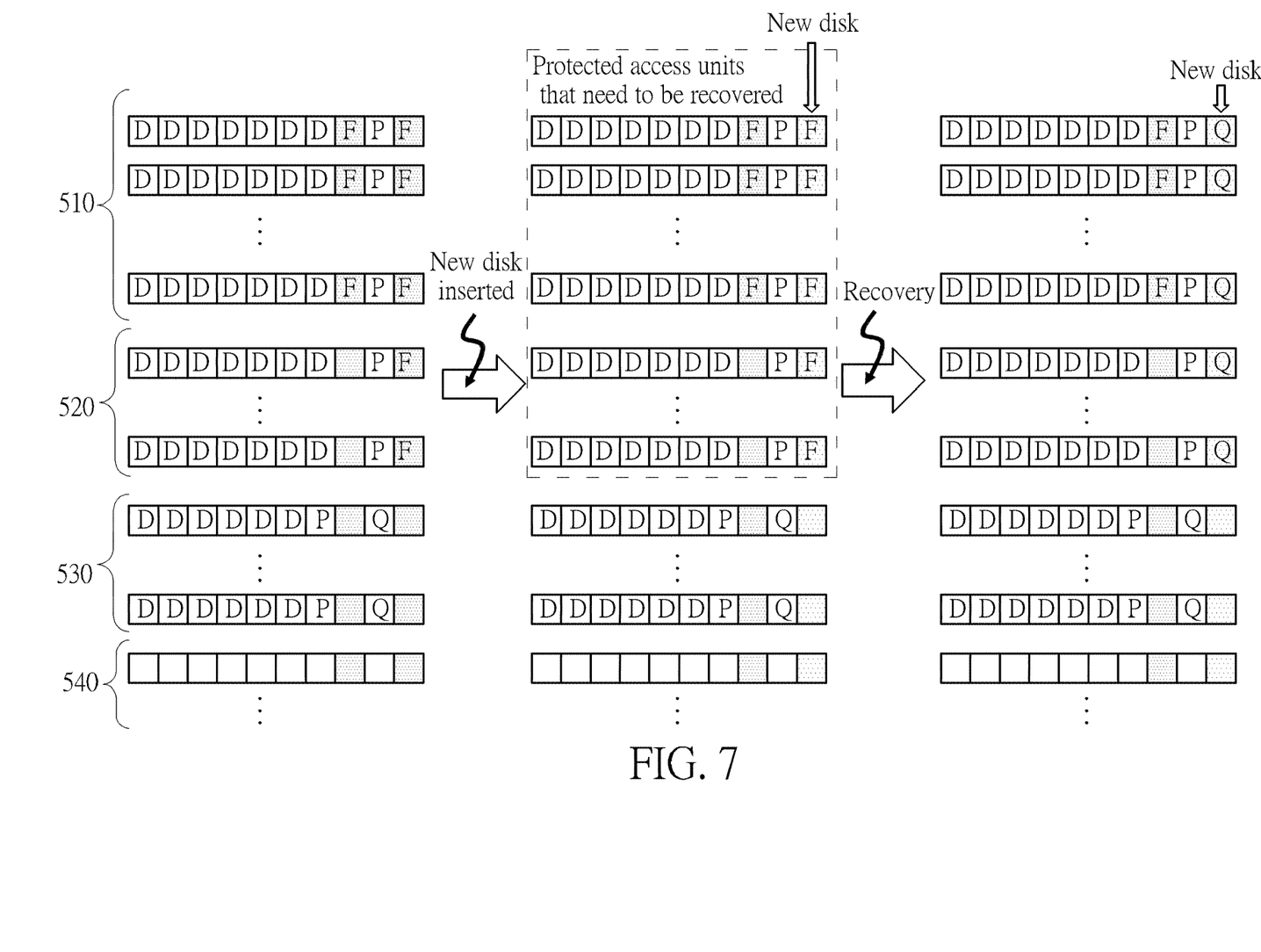
FIG. 7 illustrates a control scheme of the method according to another embodiment of the present invention.

FIG. 7 illustrates a control scheme of the method according to another embodiment of the present invention. The leftmost portion of FIG. 7 is equivalent to the rightmost portion of FIG. 6. A new storage device is coupled to the interface circuit 122 to replace a certain malfunctioning storage device; for example, this new storage device is installed in the storage system 100 to serve as the latest storage device SD9 (this is labeled "New disk inserted" for better comprehension). Protected access units within the storage system 100 that need to be recovered (or restored) at this moment may comprise respective protected access units of the groups 510 and 520. Regarding the protected data in each of the protected access units within the group 510, the storage system 100 (e.g. the processing circuit 111) may recover the parity-check code Q according to the data D respectively stored in the storage devices {SD0, SD1, . . . , SD6} and the parity-check code P stored in the storage device SD8; more particularly, the storage system 100 (e.g. the processing circuit 111) may perform ECC decoding according to the data D respectively corresponding to the storage devices {SD0, SD1, . . . , SD6} and the parity-check code P corresponding to the storage device SD8 in order to generate the data D corresponding to the storage device SD7, and perform ECC encoding according to the data respectively corresponding to the storage devices {SD0, SD1, . . . , SD7} in order to generate the parity-check code Q corresponding to the storage device SD9; and may update the corresponding validity bitmap information to be a set of second bits 1111111011000000, meaning the majority of the protected data is valid, but the protected data stored by the storage device SD7 may be regarded as invalid. In addition, regarding the protected data in each of the protected access units within the group 520, the storage system 100 (e.g. the processing circuit 111) may recover the parity-check code Q according to the data D respectively stored in the storage devices {SD0, SD1, . . . , SD6}; more particularly, the storage system 100 (e.g. the processing circuit 111) may perform ECC encoding according to the data D respectively corresponding to the storage devices {SD0, SD1, . . . , SD6} in order to generate the parity-check code Q corresponding to the storage device SD9; and may update the corresponding validity bitmap information to be a set of second bits 1111111011000000, meaning the protected data is all valid. As a result, the protected data within the group 520 is completely recovered.

Figure 8:
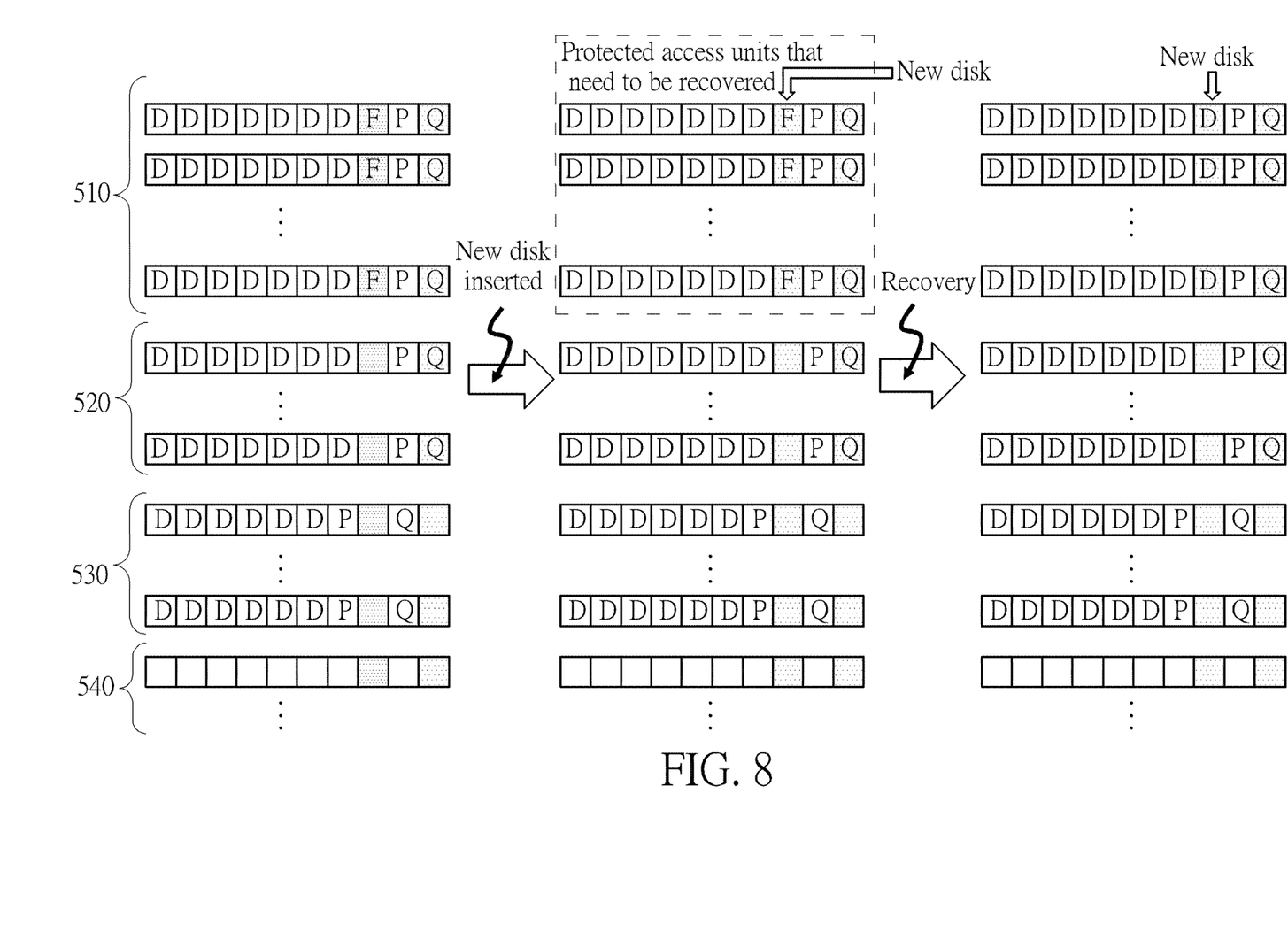
FIG. 8 illustrates a control scheme of the method according to another embodiment of the present invention.

FIG. 8 illustrates a control scheme of the method according to another embodiment of the present invention. Anew storage device is coupled to the interface circuit 122 to replace another malfunctioning storage device; for example, this new storage device is installed in the storage system 100 to serve as the latest storage device SD7 (this is labeled "New disk inserted" for better comprehension). Protected access units within the storage system 100 that need to be recovered at this moment may comprise the protected access units within the groups 510. Regarding the protected data in each of the protected access units within the group 510, the storage system 100 (e.g. the processing circuit 111) may recover the data D corresponding to the storage device SD7 according to the data D respectively stored in the storage devices {SD0, SD1, ..., SD6} and the parity-check code P stored in the storage device SD8; more particularly, the storage system 100 (e.g. the processing circuit 111) may perform ECC decoding according to the data D respectively corresponding to the storage devices {SD0, SD1, ..., SD6} and the parity-check code P corresponding to the storage device SD8 in order to generate the data D corresponding to the storage device SD7; and may update the corresponding validity bitmap information to be a set of second bits 1111111111000000, meaning the protected data is all valid. As a result, the protected data within the group 510 is completely recovered.

Figure 9:
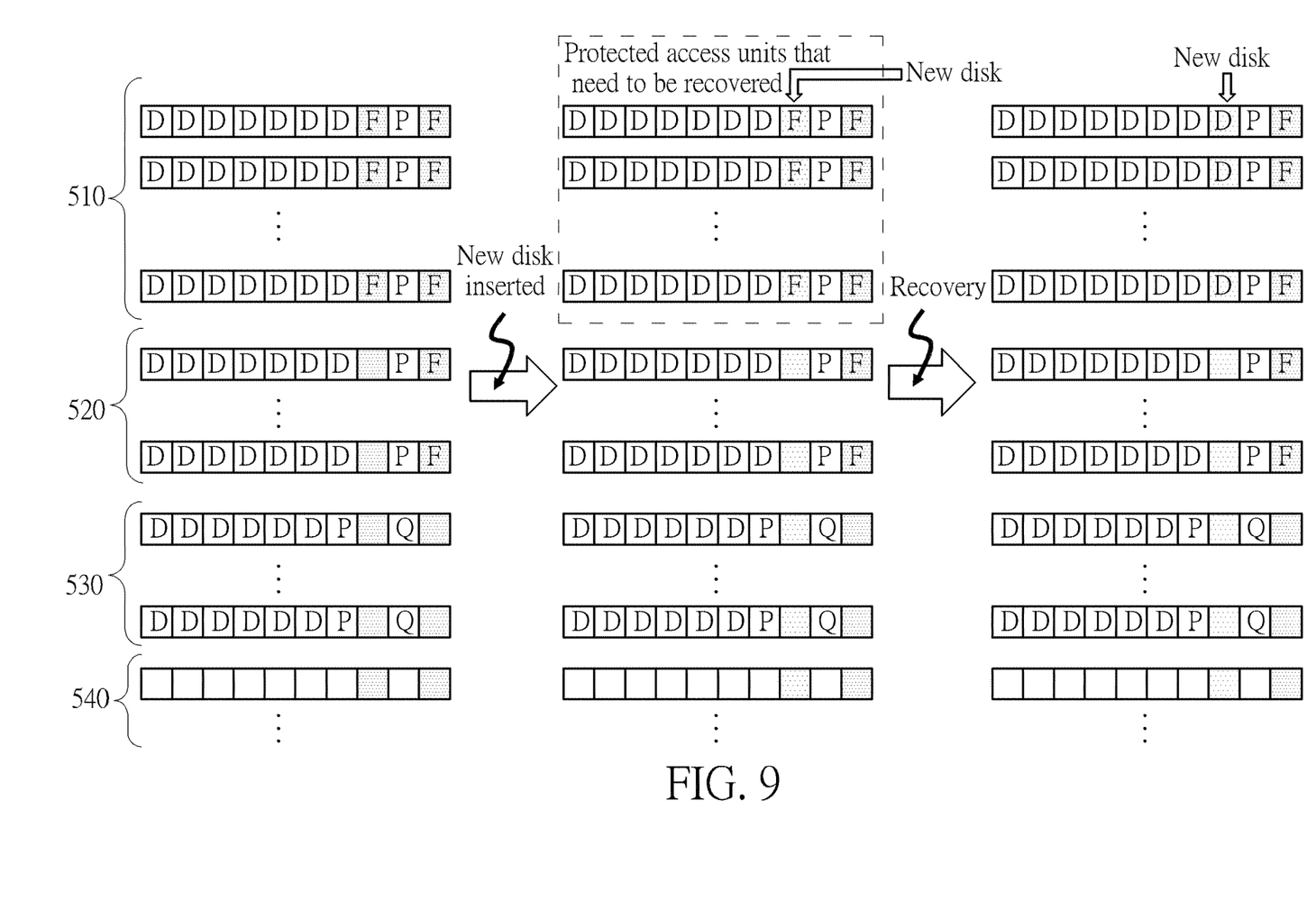
FIG. 9 illustrates a control scheme of the method according to another embodiment of the present invention.

FIG. 9 illustrates a control scheme of the method according to another embodiment of the present invention. The leftmost portion of FIG. 9 is equivalent to the rightmost portion of FIG. 6. A new storage device is coupled to the interface circuit 122 to replace a certain malfunctioning storage device; for example, this new storage device is installed in the storage system 100 to serve as the latest storage device SD7 (this is labeled "New disk inserted" for better comprehension). Protected access units within the storage system 100 that need to be recovered at this moment may comprise the protected access units within the group 510. Regarding the protected data in each of the protected access units within the group 510, the storage system 100 (e.g. the processing circuit 111) may recover the data D corresponding to the storage device SD7 according to the data D respectively stored in the storage devices {SD0, SD1, ..., SD6} and the parity-check code P stored in the storage device SD8; more particularly, the storage system 100 (e.g. the processing circuit 111) may perform ECC decoding according to the data D respectively corresponding to storage devices {SD0, SD1, ..., SD6} and the parity-check code P corresponding to the storage device SD8 in order to generate the data D corresponding to the storage device SD7; and may update the corresponding validity bitmap information to be a set of second bits 1111111110000000, meaning the majority of the protected data is valid, but the protected data stored by the storage device SD9 is regarded as invalid.

Figure 10:
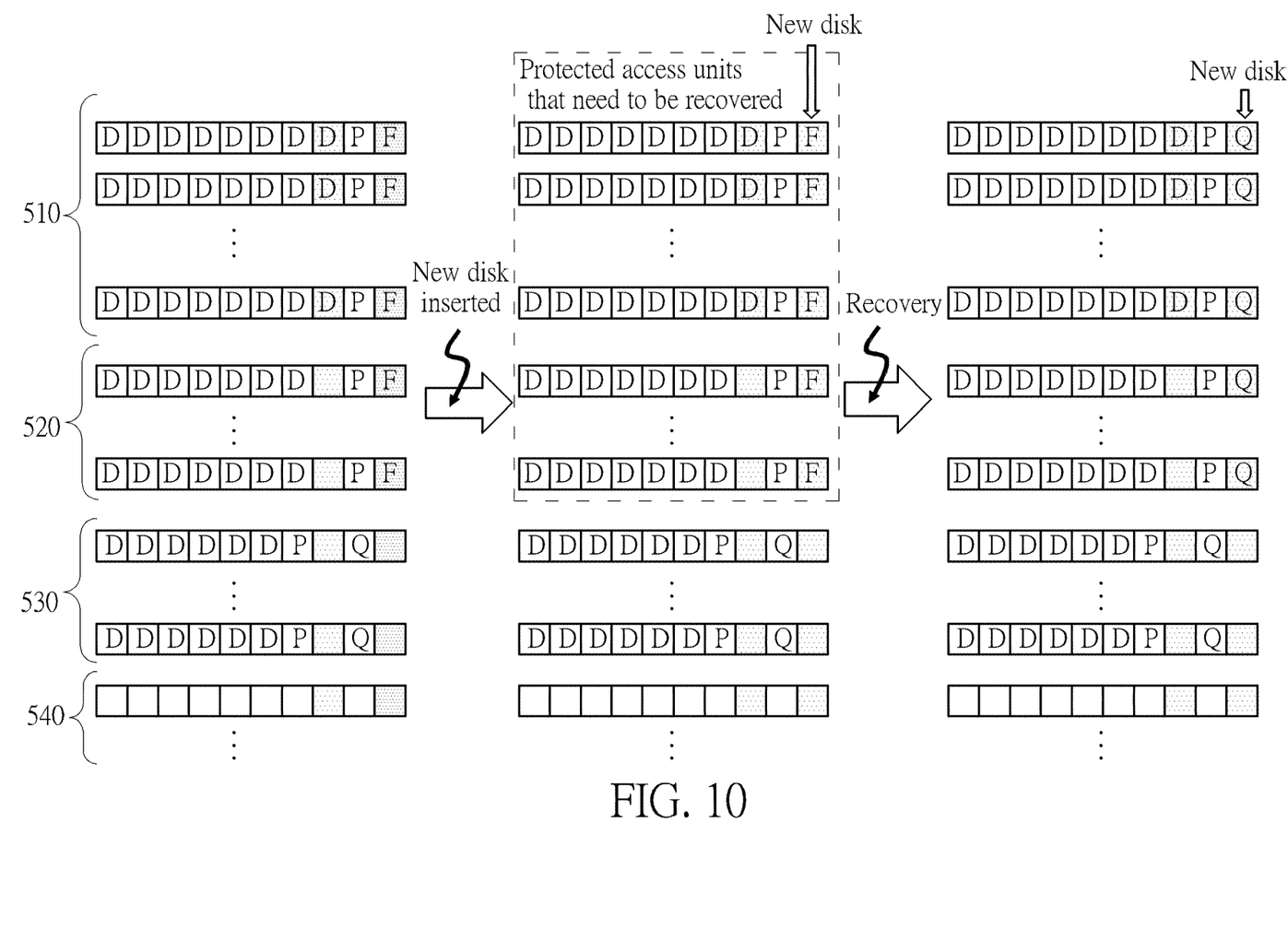
FIG. 10 illustrates a control scheme of the method according to another embodiment of the present invention.

FIG. 10 illustrates a control scheme of the method according to another embodiment of the present invention. The leftmost portion of FIG. 10 is equivalent to the rightmost portion of FIG. 9. A new storage device is coupled to the interface circuit 122 to replace another malfunctioning storage device; for example, this new storage device is installed in the storage system 100 to serve as the latest storage device SD9 (this will be labeled "New disk inserted"). The protected access units within the storage system 100 that need to be recovered at this moment may comprise respective protected access units of the group 510 and 520. Regarding the protected data in each of the protected access units within the group 510, the storage system 100 (e.g. the processing circuit 111) may recover the parity-check code Q according to the data D respectively stored in the storage devices {SD0, SD1, ..., SD7}; more particularly, the storage system 100 (e.g. the processing circuit 111) may perform ECC encoding according to the data D respectively corresponding to the storage devices {SD0, SD1, ..., SD7} in order to generate the parity-check code Q corresponding to the storage device SD9; and may update the corresponding validity bitmap information to be a set of second bits 1111111111000000, meaning the protected data is all valid. As a result, the protected data within the group 510 is completely recovered. In addition, regarding the protected data in each of the protected access units within the group 520, the storage system 100 (e.g. the processing circuit 111) may recover the parity-check code Q according to the data D respectively stored in the storage devices {SD0, SD1, ..., SD6}; more particularly, the storage system 100 (e.g. the processing circuit 111) may perform ECC encoding according to the data D respectively corresponding to the storage devices {SD0, SD1, ..., SD6} in order to generate the parity-check code Q corresponding to the storage device SD9; and may update the corresponding validity bitmap information to be a set of second bits 1111111011000000, meaning the protected data is all valid. As a result, the protected data within the group 520 is completely recovered.

According to some embodiments, the multiple sets of management information may vary. For example, regarding any set (more particularly, each set) of the multiple set of management information, a bit count of first bits within the RAID bitmap information (such as the first RAID bitmap information, the second RAID bitmap information, etc.) and/or a bit count of second bits within the validity bitmap information (such as the first validity bitmap information, the second validity bitmap information, etc.) may vary (e.g. increase or decrease). For brevity, similar descriptions for these embodiments are not repeated in detail here.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing dynamic recovery management regarding a redundant array of independent disks (RAID), the method comprising:

writing, by utilizing a processing circuit, a first set of protected data into a first protected access unit of multiple protected access units of the RAID, and recording, by utilizing the processing circuit, a first set of management information corresponding to the first set of protected data, for data recovery of the first set of protected data, wherein the RAID comprises multiple storage devices, the first set of protected data comprises data and multiple parity-check codes, RAID information within the first set of management information indicates the first set of protected data is stored in a first set of storage devices of the multiple storage devices, and validity information within the first set of management information indicates respective validities of the first set of protected data; and in response to any storage device of the multiple storage devices malfunctioning, writing, by utilizing the processing circuit, a second set of protected data into a second protected access unit of the multiple protected access units, and recording, by utilizing the processing circuit, a second set of management information corresponding to the second set of protected data, for data recovery of the second set of protected data, wherein the second set of protected data comprises data and multiple parity-check codes, RAID information within the second set of management information indicates the second set of protected data is stored in a second set of storage devices of the multiple storage devices, and validity information within the second set of management information indicates respective validities of the second set of protected data;

wherein the second set of storage devices is different from the first set of storage devices.

2. The method of claim 1, wherein the RAID information within the first set of management information comprises first RAID bitmap information, the first RAID bitmap information comprises a first set of first bits, and the first set of first bits indicates the first set of protected data is respectively stored in the first set of storage devices.

3. The method of claim 2, wherein the RAID information within the second set of management information comprises second RAID bitmap information, the second RAID bitmap information comprises a second set of first bits, and the second set of first bits indicates the second set of protected data is respectively stored in the second set of storage devices.

4. The method of claim 1, wherein the validity information within the first set of management information comprises first validity bitmap information, the first validity bitmap information comprises a first set of second bits, and the first set of second bits indicates respective validities of the first set of protected data, respectively.

5. The method of claim 4, wherein the validity information within the second set of management information comprises second validity bitmap information, the second validity bitmap information comprises a second set of second bits, and the second set of second bits indicates respective validities of the second set of protected data, respectively.

6. The method of claim 1, wherein the second set of storage devices does not comprise said any storage device.

7. The method of claim 1, further comprising:
in response to said any storage device malfunctioning, updating the validity information within the first set of management information to indicate protected data within the first set of protected data stored in said any storage device is invalid, for data recovery of the first set of protected data.

8. The method of claim 7, further comprising:
according to latest validity information within the first set of management information, reading valid protected data of the first set of protected data to perform data recovery of the first set of protected data according to the valid protected data, wherein the valid protected data comprises at least one portion of the data within the first set of protected data, and comprises at least one parity-check code of the multiple parity-check codes within the first set of protected data.

9. The method of claim 7, further comprising:
in response to a second storage device of the multiple storage devices malfunctioning, updating the validity information within the first set of management information to indicate protected data within the first set of protected data stored in the second storage device is invalid, for data recovery of the first set of protected data.

10. The method of claim 9, further comprising:
according to latest validity information within the first set of management information, reading valid protected data of the first set of protected data to perform data recovery of the first set of protected data according to the valid protected data, wherein the valid protected data comprises at least one portion of the data within the first set of protected data.

11. The method of claim 7, further comprising:
in response to a second storage device of the multiple storage devices malfunctioning, updating the validity information within the second set of management information to indicate protected data within the second set of protected data stored in the second storage device is invalid, for data recovery of the second set of protected data.

12. The method of claim 11, further comprising:
according to latest validity information within the second set of management information, reading valid protected data of the second set of protected data to perform data recovery of the second set of protected data according to the valid protected data, wherein the valid protected data comprises at least one portion of the data within the second set of protected data, and comprises at least one parity-check code of the multiple parity-check codes within the second set of protected data.

13. A storage system operating according to the method of claim 1, wherein the storage system comprises the RAID.

14. An apparatus for performing dynamic recovery management regarding a redundant array of independent disks (RAID), the apparatus comprising:
a processing circuit, positioned in a storage system, configured to control operations of the storage system, wherein the operations of the storage system comprise:
writing a first set of protected data into a first protected access unit of multiple protected access units of the RAID, and recording a first set of management information corresponding to the first set of protected data, for data recovery of the first set of protected data, wherein the RAID comprises multiple storage devices, the first set of protected data comprises data and multiple parity-check codes, RAID information within the first set of management information indicates the first set of protected data is stored in a first set of storage devices of the multiple storage devices, and validity information within the first set of management information indicates respective validities of the first set of protected data; and
in response to any storage device of the multiple storage devices malfunctioning, writing a second set of protected data into a second protected access unit of the multiple protected access units, and recording a second set of management information corresponding to the second set of protected data, for data recovery of the second set of protected data, wherein the second set of protected data comprises data and multiple parity-check codes, RAID information within the second set of management information indicates the second set of protected data is stored in a second set of storage devices of the multiple storage devices, and validity information within the second set of management information indicates respective validities of the second set of protected data;
wherein the second set of storage devices is different from the first set of storage devices.

\* \* \* \* \*